US007802730B2

(12) United States Patent
Senda

(10) Patent No.: US 7,802,730 B2
(45) Date of Patent: Sep. 28, 2010

(54) INFORMATION CARRIER INTEGRATED WITH AN OPTICALLY READABLE INFORMATION SYMBOL

(75) Inventor: Katsumi Senda, Nagoya (JP)

(73) Assignee: Denso Wave Incorporated, Tokyo (JP)

(*) Notice: Subject to any disclaimer, the term of this patent is extended or adjusted under 35 U.S.C. 154(b) by 938 days.

(21) Appl. No.: 11/583,011

(22) Filed: Oct. 19, 2006

(65) Prior Publication Data

US 2007/0090197 A1 Apr. 26, 2007

(30) Foreign Application Priority Data

Oct. 21, 2005 (JP) ............................. 2005-307082

(51) Int. Cl.
G06K 19/06 (2006.01)
(52) U.S. Cl. ........................................ 235/494; 235/487
(58) Field of Classification Search ................. 235/487, 235/494, 495, 462.01, 462.08, 462.09, 462.1
See application file for complete search history.

(56) References Cited

U.S. PATENT DOCUMENTS

| | | | | | |
|---|---|---|---|---|---|
| 4,827,114 | A | * | 5/1989 | Blachon | 235/487 |
| 4,880,964 | A | * | 11/1989 | Donahue | 235/488 |
| 4,924,078 | A | * | 5/1990 | Sant'Anselmo et al. | 235/494 |
| 5,177,368 | A | * | 1/1993 | Kay | 250/566 |
| 5,243,173 | A | * | 9/1993 | Dunn | 235/375 |
| 5,492,222 | A | * | 2/1996 | Weaver | 206/459.5 |
| 5,691,527 | A | * | 11/1997 | Hara et al. | 235/456 |
| 5,726,435 | A | | 3/1998 | Hara et al. | |
| 6,000,614 | A | * | 12/1999 | Yang et al. | 235/460 |
| 6,267,296 | B1 | * | 7/2001 | Ooshima et al. | 235/487 |
| 6,279,830 | B1 | * | 8/2001 | Ishibashi | 235/494 |
| 6,880,313 | B1 | * | 4/2005 | Gessford et al. | 53/442 |
| 2003/0047477 | A1 | * | 3/2003 | Nygardh et al. | 206/459.1 |
| 2003/0146288 | A1 | * | 8/2003 | Berson | 235/494 |
| 2004/0104141 | A1 | * | 6/2004 | Norrby et al. | 206/459.1 |
| 2004/0248305 | A1 | * | 12/2004 | Vaillant | 436/2 |

FOREIGN PATENT DOCUMENTS

| | | |
|---|---|---|
| CN | 1119311 A | 3/1996 |
| JP | H07-254037 | 10/1995 |
| JP | 2004-198616 | 7/2004 |
| JP | A-2004-198616 | 7/2004 |
| WO | WO 2004/050507 | 6/2004 |

OTHER PUBLICATIONS

Office Action dated Mar. 7, 2008 in corresponding Chinese Patent Application No. 2006100647746 (and English translation).
QR Code, http://en.wikipedia.org/w/index.php?title=OR Code &oldid=21837619, Aug. 2005.
Office Action dated Sep. 11, 2008 in corresponding German patent application No. 10 2006 049 578.0-53 (and English translation).

* cited by examiner

*Primary Examiner*—Daniel A Hess
*Assistant Examiner*—Paultep Savusdiphol
(74) *Attorney, Agent, or Firm*—Posz Law Group, PLC

(57) ABSTRACT

In an optically readable information carrier, an information symbol has a predetermined area and includes an optically readable mark. The optically readable mark indicates at least part of the predetermined area. The information symbol is optically readable by an information reader after the predetermined area has been identified thereby. A mask member is arranged to abut on the information symbol. The mask member is also arranged to mask at least part of the optically readable mark while keeping presence of the information symbol externally visible to change the predetermined area of the information symbol to be unidentifiable.

12 Claims, 10 Drawing Sheets

INFORMATION CARRIER INTEGRATED WITH AN OPTICALLY READABLE INFORMATION SYMBOL

CROSS REFERENCE TO RELATED APPLICATION

This application is based on Japanese Patent Application 2005-307082 filed on Oct. 21, 2005. This application aims at the benefit of priority from the Japanese Patent Application, so that the descriptions of which are all incorporated herein by reference.

BACKGROUND OF THE INVENTION

1. Field of the Invention

The present invention relates to information carriers integrated with an optically readable information symbol, such as one-dimensional code, a two-dimensional code, and/or other types of codes. For example, the one-dimensional code includes barcodes, and the two-dimensional code includes QR Codes®.

2. Description of the Related Art

Optical information code, such as barcodes and QR codes, have been used to bring us various services to promote the sales of commercial products, to practice public relations, and the like.

For example, service information that allows users to obtain some kind of gifts and/or incentives is coded to be contained in a QR so that the QR code is attached to commercial goods.

When a customer uses an imaging device, such as an optical information scanner, a phone's built-in camera, and the like, to read the QR code attached to a commercial product, the customer sends the readout QR code to a designated Web site through a network with the use of the phone or a computer terminal. This allows the customer to obtain some kinds of gifts and/or incentives, such as to get points added to user's accumulated points and to participate in prize competition.

In this service method using QR codes, someone can illegally read the QR code attached to a commercial product with the use of an imaging device before buying it. For this reason, it is necessary to take counter measures to prevent someone from illegally reading, with the use of an imaging device, a QR code attached to a commercial product before buying it.

In order to solve the illegal reading problem set forth above, Japanese Unexamined Patent Publication No. 2004-198616 discloses techniques for creating a layered label consisting essentially of a first label element and a second label element to be attached on part of the outer surface of a commercial product, such as a canned coffee.

In one typical example of the disclosed techniques, a barcode for identifying various information of a corresponding commercial product is printed on one surface of the second label element, and a QR code with service information is printed on part of one outer surface of the first label element. Thereafter, the second label element is laminated on the one surface of the first label element so as to keep the QR code out of view.

This results in that the layered label with the barcode and the QR code is attached on the outer surface of the corresponding commercial product such that the first label element is mounted thereon.

The layered label allows customers to:

read the barcode with the use of an imaging device; and read the QR code with the use of an imaging device only after removal of the second label from the layered label.

It is to be noted that U.S. Pat. Publication No. 5,726,435 corresponding to Japanese Unexamined Patent Publication No. H07-254037 discloses procedures for reading a two-dimensional code, such as a QR code, for just reference.

In the techniques disclosed in the Patent Publication No. 2004-198616, it is necessary to:

print a two-dimensional code on part of the one surface of the first label element; and laminate, in addition to the print, the second label element on the one surface of the first label element so as to cover the whole of the two-dimensional code, thereby generating the layered label.

That is, the techniques disclosed in the Patent Publication No. 2004-198616 may take a lot of trouble to cover the whole of the two-dimensional code, thereby making the two-dimensional code externally invisible.

Moreover, the techniques disclosed in the Patent Publication No. 2004-198616 need to add, to the barcode or the like, a message representing that allows customers to remove the second label in order to read the QR code. This is because the two-dimensional code is completely covered with the second label element to be externally invisible.

In addition, the techniques need labels to attach the barcode and QR code on the outer surface of commercial products. The techniques require to provide a wide space on the outer surface of the commercial goods for attaching the layered label thereon. For this reason, the possibility of commercial-product design may be limited.

Because such specific layered labels may be used during a predetermined campaign period to give customers some kinds of gifts and/or incentives, it is necessary to:

prepare another design of commercial products for ensuring wide space on its outer surface for attaching the layered label thereon; and prepare base materials to produce the first and second label elements. This may also take a lot of trouble to create the layered label.

SUMMARY OF THE INVENTION

In view of the background, an object of at least one aspect of the present invention is to provide information carriers having an information symbol externally visible, which are capable of easily changing the externally visible information symbol to be unreadable by information readers.

According to one aspect of the present invention, there is provided an optically readable information carrier. The optically readable information carrier includes an information symbol having a predetermined area and including an optically readable mark. The optically readable mark indicates at least part of the predetermined area. The information symbol is optically readable by an information reader after the predetermined area has been identified thereby. The optically readable information carrier also includes a mask member arranged to abut on the information symbol. The mask member is also arranged to mask at least part of the optically readable mark while keeping presence of the information symbol externally visible to change the predetermined area of the information symbol to be unidentifiable.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1A:
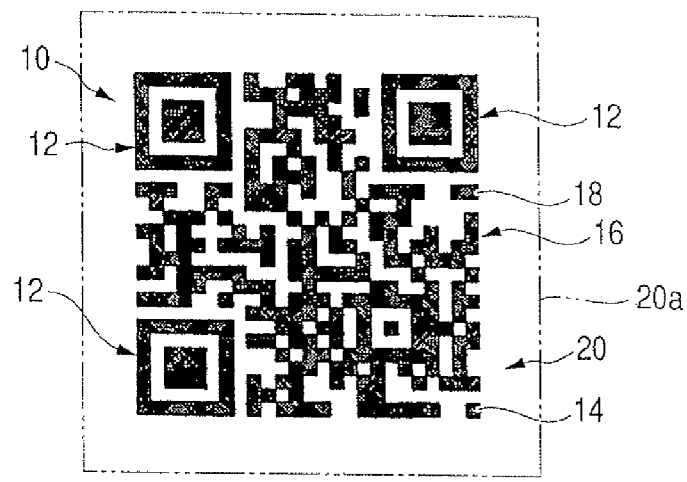
FIG. 1A is a view schematically illustrating a QR code to be directly printed on a surface portion 20 of a resin container containing liquid detergent according to a first embodiment of the present invention.

FIG. 1A schematically illustrates a QR code 10, as an example of optically readable symbols, to be directly printed on a surface portion 20 of a resin container package containing therein liquid detergent as an example of commercial products according to a first embodiment of the present invention.

The QR code 10 has a substantially square shape with four apexes at its corners. The QR code 10 is composed of three isolated positioning marks 12, 12, 12 disposed respectively at three corners of the QR code 10.

The QR code 10 is also composed of an apex detecting cell 14 located at the remaining corner of the QR code 10, and of a data region 16 arranged among the three isolated positioning marks 12, 12, 12 and the apex detecting cell 14.

The QR code 10 is constituted by the same number of vertical and horizontal cells 18, for example, 21 cells×21 cells.

Each cell 18 is selected from optically identifiable two kinds of cells. For example, in the first embodiment, one of the optically identifiable two kinds of cells is printed in black (dark) color whereas the other thereof is printed in white (light) color whose light reflectance is different from that of the black (dark) color (see FIG. 1A).

Part 20a of the surface portion 20 of the container package around the QR code 10, which has a substantially square annular shape, serves as a margin with a predetermined length (s) from the outer periphery of the QR code 10. The margin 20a allows the outer periphery of the QR code 10 to be identifiable.

The three isolated positioning marks 12, 12, 12 and the apex detecting cell 14 allow the total QR code area to be identified.

Figure 2A:
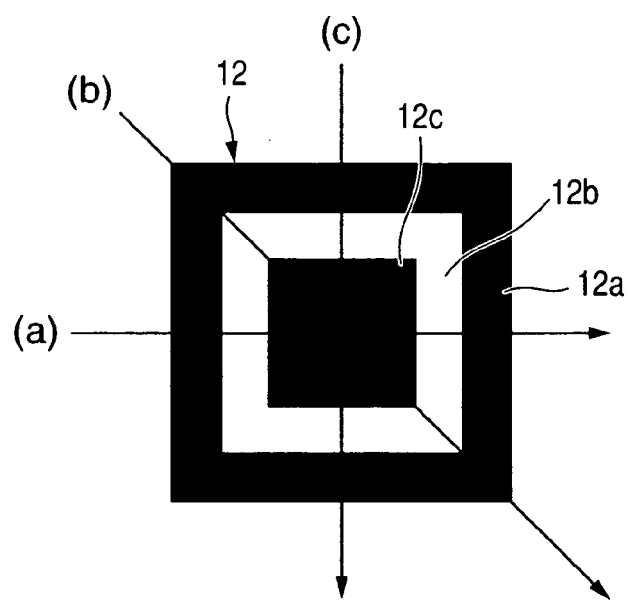
FIG. 2A is a view schematically illustrating the positional relationships between orientations of a positioning symbol of the QR code and a horizontal scanning line of a CCD camera according to the first embodiment.

As schematically illustrated in FIG. 2A, each of the positioning marks 12 includes a first pattern 12a having a large square annular shape and consisting essentially of black (dark) cells. The first pattern 12a has a width of one cell and constitutes the outer periphery of each of the positioning marks 12.

Each of the positioning marks 12 also includes a second pattern 12b having a middle square annular shape and consisting essentially of white (light) cells. The second pattern 12b has a width of one cell and is similarly smaller in size than the first pattern 12a. The second pattern 12b is concentrically and adjacently arranged with respect to the first pattern 12a.

Each of the positioning marks 12 further includes a third pattern 12c consisting essentially of vertical 3 black cells× horizontal 3 black cells in shape of square. The third pattern 12c is concentrically and adjacently arranged with respect to the second pattern 12b so that the combination of the first to third patterns 12a to 12c constitutes the square mark 12.

Figure 1B:
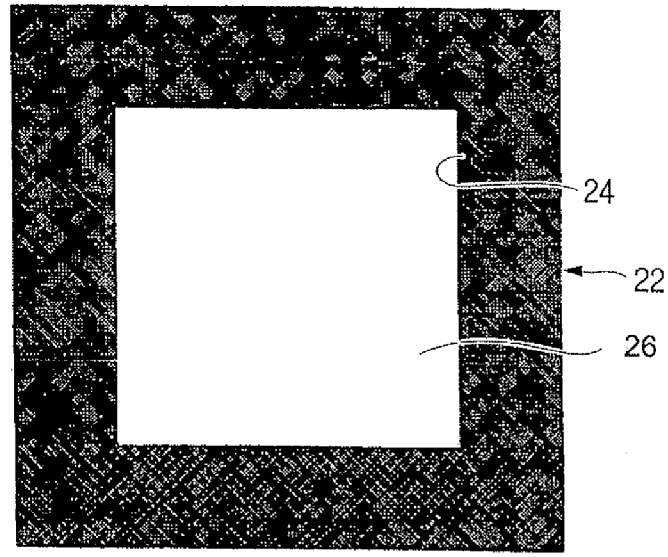
FIG. 1B is a view schematically illustrating a sticker for causing the QR code to be unreadable according to the first embodiment.

FIG. 1B schematically illustrates a sticker 22 for causing the QR code 10 to be unreadable according to the first embodiment.

The sticker 22 is made of transparent resin, and composed of a transparent portion 26 whose shape and size are substantially equivalent to those of the QR code 10. The sticker 22 also is also composed of a frame 24 having a substantially square annular shape capable of covering the margin 20a around the QR code 10.

For example, the frame 24 is printed in black (dark) color equivalent to the printed color of the first pattern 12a of each of the positioning marks 12.

Specifically, the black cells of the QR code 10 and the frame 24 of the sticker 22 are printed in the same color ink or in different inks each of which has the same light reflectance.

Figure 1C:
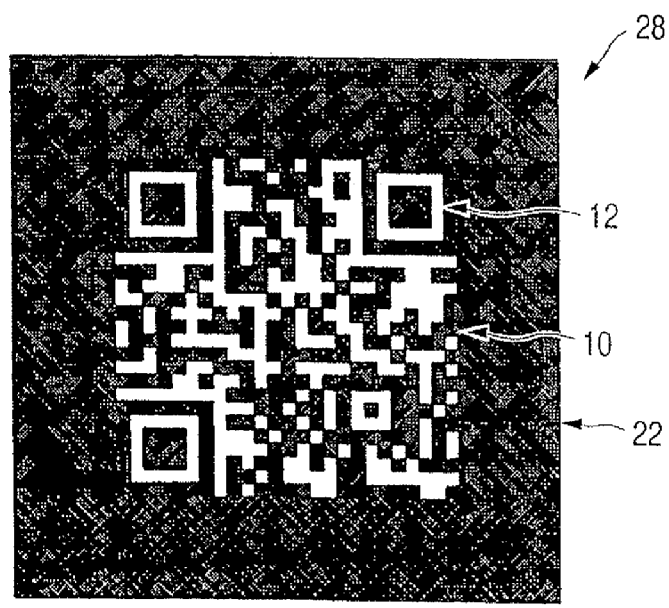
FIG. 1C is a view schematically illustrating a QR code carrier according to the first embodiment.

FIG. 1C schematically illustrates a QR code carrier 28 according to the first embodiment.

The QR code carrier 28 is composed of the QR code 10 illustrated in FIG. 1A; and the sticker 22 removably adhered onto the QR code 10 such that the transparent portion 26 is aligned with the QR code 10.

The configuration of the QR code carrier 28 allows the frame 24 of the sticker 22 to abut on the QR code 10, thereby covering the margin 20a around the QR code 10. Because the color of the frame 24 is the same as that of the first pattern 12a of each of the positioning marks 12, the frame 24 masks the first pattern 12a of each of the positioning marks 12. This makes it difficult to identify the outer periphery of the QR code 10, in other words, to identify each of the positioning marks 12.

As a result, it is difficult to identify the location and/or orientation of the QR code 10, and therefore, it is impossible to read out the QR code 10. This is because the QR code 10 is possible to be read out after identification of the outer periphery of the QR code 10, in other words, identification of the total QR code area.

Figure 3:
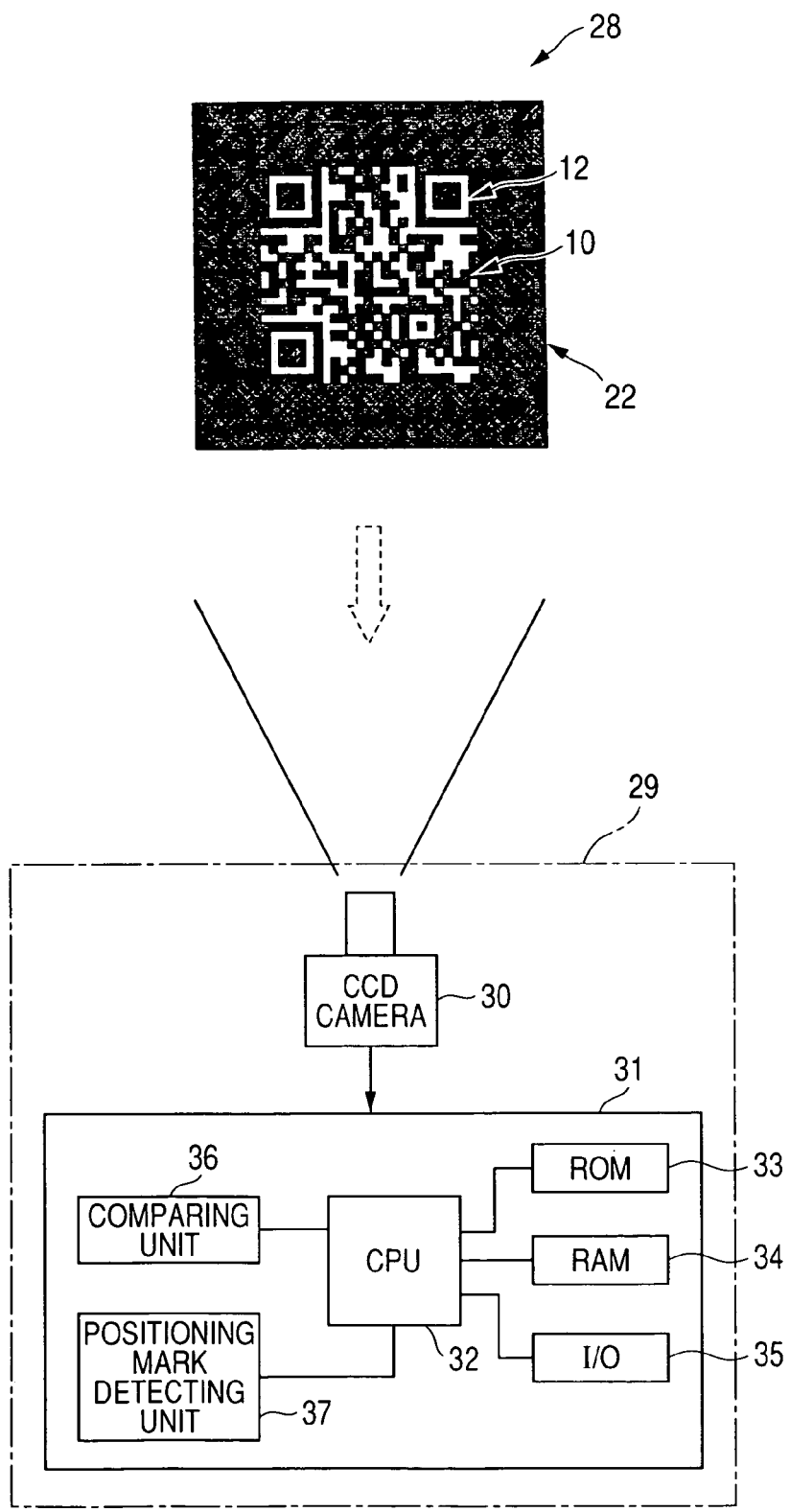
FIG. 3 is a block diagram schematically illustrating an example of the structure of an imaging device according to the first embodiment.

Specifically, FIG. 3 schematically illustrates an imaging device 29 for reading the QR code 10. The imaging device 29 includes a CCD camera 30 and a decoder 31. The CCD camera 30 has an imaging optics and, for example, a two-dimensional CCD area sensor with a light sensitive pixel area composed of pixels vertically and horizontally arranged in matrix (in height and width). The imaging optics and the CCD area sensor are optically aligned with each other. For example, at least part of the pixels of the CCD area sensor corresponds to the cells of the QR code 10.

The decoder 31 includes a CPU 32, a ROM 33 (Read Only Memory, such as flash ROM), a RAM 34, and an I/O (Input/Output unit) 35. The ROM 33, RAM 34, and the I/O 35 are electrically connected to the CPU 32. The decoder 31 also includes a comparing unit 36 and a positioning mark detecting unit 37 electrically connected to the CPU 32.

The CPU 32 is operative to communicate with an exterior computer, such as a host computer 38 via the I/O 35.

Next, reading operations of the imaging device 29 in reading the QR code carrier 28 and the QR code itself will be described hereinafter.

For example, when someone wants to take an image of the QR code carrier 28 to illegally read the QR code 10 before purchasing the corresponding packaged commercial product (the packaged liquid detergent), someone locates the CCD camera 30 of the imaging device 29 such that the QR code carrier 28 attached to the package of the commercial product is contained in its FOV (Field Of View).

When light is reflected from the QR code carrier 28, the reflected light is imaged by the imaging optics of the CCD camera 30 on the pixel area thereof. The CCD camera 30 is operative to pick up image data of the QR code carrier 28 in analog form; this image data corresponds to the QR code carrier 28.

Specifically, the charge in each pixel of the pixel area of the CCD camera 30 based on the reflected light imaged on the pixel area is scanned horizontal-line by horizontal-line so that the image data in analog form corresponding to light intensity data (pixel data) of each pixel of the pixel area is obtained. The image data of each pixel in analog form is sequentially output to the decoder 31.

When the CPU 32 of the decoder 31 sequentially receives the image data of each pixel output from the CCD camera 30, the CPU 32 starts to execute a reading task in accordance with a reading program being loaded in the RAM 34 or ROM 33.

Figure 4:
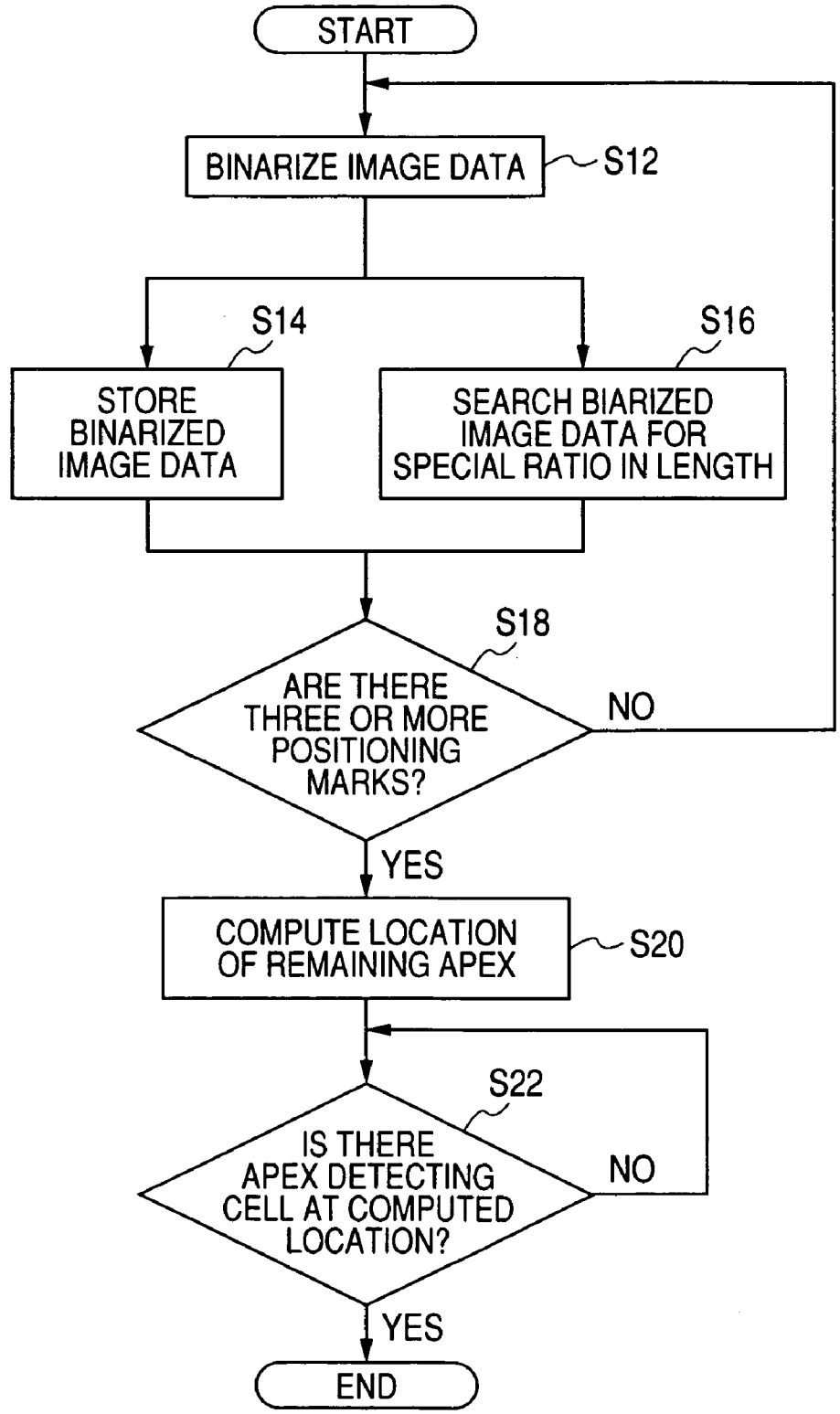
FIG. 4 is a flowchart schematically illustrating flow of operations executed by a CPU and the like of a decoder of the imaging device according to the first embodiment.

Specifically, as schematically illustrated in FIG. 4, the CPU 32 controls the comparing unit 36 to compare the level of the image data of each pixel with a predetermined threshold level, thereby binarizing the image data of each pixel to binary data of each pixel in step S12 of FIG. 4.

The CPU 32 controls the comparing unit 36 so that the binarized image data of each pixel, which is a dark pattern or a light pattern, is sequentially stored in the RAM 34 while a predetermined unique address corresponding to each pixel is assigned thereto in step S14. As a result, the binarized image data of the QR code carrier 28, which corresponds to the dark and light patterns of the QR code carrier 28, is obtained.

In parallel to the operation in step S14, the CPU 32 controls the positioning mark detecting unit 37 to execute a positioning mark detecting operation based on the binarized image data stored in the RAM 34.

Under control of the CPU 32, the positioning mark detecting unit 37 searches the binarized image data (the dark and light patterns) for a special ratio in length in step S16.

Specifically, FIG. 2A shows the positional relationships between the orientations of the positioning mark 12 (QR code) 10 and the horizontal scanning line of the CCD camera 30.

In FIG. 2A, if the QR code 10 (each of the positioning marks 12) is oriented so that its one pair of opposing sides is parallel to the horizontal scanning line passing through the center of one of the marks 12, the horizontal scanning line is shown as reference character (a).

If the QR code 10 (each of the positioning marks 12) is oriented so that its one pair of opposing sides is inclined with respect to the horizontal scanning line passing through the center of one of the marks 12 at an angle of, for example, 45 degrees, the horizontal scanning line is shown as reference character (b).

If the QR code 10 (each of the positioning marks 12) is oriented so that its one pair of opposing sides is inclined with respect to the horizontal scanning line passing through the center of one of the marks 12 at an angle of, for example, 90 degrees, the horizontal scanning line is shown as reference character (c).

Figure 2B:
FIG. 2B is a view schematically illustrating signal waveforms corresponding to light and dark patterns respectively detectable along horizontal scanning lines (a), (b), and (c) illustrated in FIG. 2A.
Figure 2B:
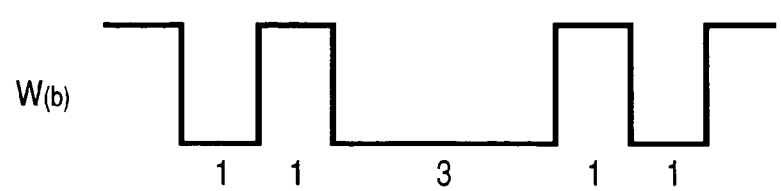
Figure 2B:
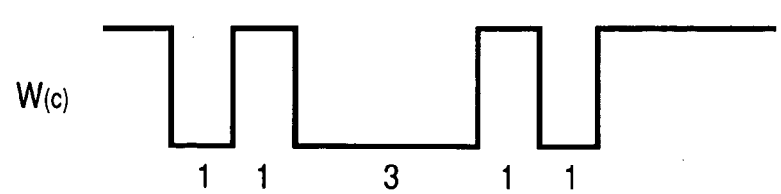

FIG. 2B shows signal waveforms W(a), W(b), and W(c) corresponding to the light and dark patterns respectively detectable along the horizontal scanning lines (a), (b), and (c). As clearly illustrated in FIG. 2B, the frequency component ratios of the signal waveforms W(a), W(b), and W(c) are equivalent to each other.

Specifically, the frequency component ratio obtainable from each of the horizontal scanning lines (a), (b), and (c) passing through the center of the positioning mark 12 is represented as follows:

dark:light:dark:light:dark=1:1:3:1:1

That is, as clearly illustrated in FIG. 2A, the ratio in length among the dark and light patterns of the positioning mark 12 is constantly set to the ratio of 1 (dark):1 (light):3 (dark):1 (light):1 (dark) independently of any orientations of the QR code 10 (QR code carrier 28) with respect to the horizontal scanning line.

Accordingly, the positioning mark detecting unit 37 searches the binarized image data (the dark and light patterns) for a special ratio of 1 (dark):1 (light):3 (dark):1 (light):1 (dark) in length in step S16.

As set forth above, in the first embodiment, the frame 24 of the sticker 22 covers the margin 20a around the QR code 10, and the color of the frame 24 is the same as that of the first pattern 12a of each of the positioning marks 12. This allows the frame 24 to mask the first pattern 12a of each of the positioning marks 12.

For this reason, the positioning mark detecting unit 37 cannot detect each of the positioning marks 12, and therefore cannot detect the special ratio of 1 (dark):1 (light):3 (dark):1 (light):1 (dark) in length in step S16. The positioning mark detecting unit 37 sends the result of detection to the CPU 32.

In step S18, based on the result of detection sent from the positioning mark detecting unit 37, the CPU 32 determines that three or more positioning marks are not detected by the positioning mark detecting unit 37 (the determination in step S18 is NO). Then, the CPU 32 does not proceed to the next step S20, returning to step S12 and standing by for image data of each pixel being output from the CCD camera 30 again.

As described above, even if someone takes an image of the QR code carrier 28 to illegally read the QR code 10, because the sticker 22 makes unidentifiable the outer periphery of the QR code 10, it is possible to prevent each of the positioning marks 12 from being identified. This makes it impossible for someone to illegally read the QR code 10.

In contrast, a customer purchases the packaged commercial product (liquid detergent) to which the QR code carrier 28 is printed. Then, the customer removes the sticker 22 from the QR code carrier 28, and thereafter, uses the imaging device 29 to read the QR code 10.

In this case, the customer locates the CCD camera 30 of the imaging device 29 such that the QR code 10 is contained in its FOV.

When light is reflected from the QR code 10, the reflected light is imaged by the imaging optics of the CCD camera 30 on the pixel area thereof. Thereafter, as in the case of reading the QR code carrier 28, the image data of each pixel is sequentially output from the CCD camera 30. When the CPU 32 of the decoder 31 sequentially receives the image data of each pixel output from the CCD camera 30, the CPU 32 starts to execute the reading task in accordance with the reading program being loaded in the RAM 34 or ROM 33.

As in the case of the reading task for the image data of the QR code carrier 28, the CPU 32 executes the operations in step S12 and S14. These operations allow the binarized image data of the QR code 10, which corresponds to the dark and light patterns of the QR code 10, to be obtained, and therefore, the obtained binarized image data is stored in the RAM 34.

Subsequently, in parallel to the operation in step S14, the CPU 32 controls the positioning mark detecting unit 37 to execute the positioning mark detecting operation based on the binarized image data stored in the RAM 34.

Under control of the CPU 32, the positioning mark detecting unit 37 searches the binarized image data (the dark and light patterns) for a special ratio of 1 (dark):1 (light):3 (dark):1 (light):1 (dark) in length in step S16.

In this case, the sticker 22 is removed from the QR code carrier 28 so that the first pattern 12a of each of the positioning marks 12 (the outer periphery of the QR code 10) is identifiable.

For this reason, the positioning mark detecting unit 37 easily retrieves the special ratio of 1 (dark):1 (light):3 (dark):1 (light):1 (dark) in length, which corresponds each of the positioning marks 12, in the continuous dark patterns and light patterns (the binarized image data) in step S16. The positioning mark detecting unit 37 sends the result of detection to the CPU 32.

In step S18, based on the result of detection sent from the positioning mark detecting unit 37, the CPU 32 determines that three positioning marks 12 are detected by the positioning mark detecting unit 37 (the determination in step S18 is YES). Then, the CPU 32 proceeds to step S20.

In step S20, the CPU 32 computes the location of the remaining apex at which no positioning marks are located based on the identified locations of the three positioning marks 12. Next, the CPU 32 determines whether there is the apex detecting cell 14 at the computed location of the binarized image data in step S22.

If it is determined that there is not the apex detecting cell 14 at the computed location of the binarized image data in step S22 (the determination in step S22 is NO), the CPU 32 retries the determination in step S22 at predetermined times.

Otherwise if it is determined that there is the apex detecting cell 14 at the computed location of the binarized image data in step S22, (the determination in step S22 is YES), the CPU 32 determines that the identification of the total QR code area has been completed.

Thereafter, the CPU 32 starts to read information stored in the cells 18 in the data region 16 (see FIG. 1A). Examples of the information reading operation are taught by U.S. Pat. Publications No. 5,726,435, and therefore, the disclosure of which is incorporated totally herein by reference.

As described above, the QR code carrier 28 according to the first embodiment to be printed on the surface portion 20 of a packaged commercial product, such as the container-packaged liquid detergent, is configured such that the frame 24 is arranged around the QR code 10 to abut on the QR code 10, thereby covering the margin 20a therearound. This permits the frame 24 to mask the outer periphery of the QR code 10 with the QR code 10 being kept externally visible, making it impossible to identify the total QR code area.

Specifically, the sticker 22 on which the frame 24 is printed is removably adhered onto the QR code 10 of the surface portion 20 of the packaged commercial product such that the transparent portion 26 is aligned with the QR code 10.

The arrangement of the transparent portion 26 allows customers to visibly identify externally there is the QR code 10 while it is kept unreadable. In addition, after buying the packaged commercial product, a customer removes the sticker 22 from the QR code carrier 28, changing the QR code carrier 28 such that the QR code 10 is readable.

Particularly, in the first embodiment, the QR code 10 is directly printed on the surface portion 20 of the package of a commercial product, such as the resin container package thereof, which allows savings in time and in human-power to add QR codes to commercial products. Because customers can visibly identify externally the QR code 10, it is unnecessary to add a message representing that customers can read the QR code 10.

Moreover, in the first embodiment, addition of the frame 24 to the QR code 28 such that the frame 24 is arranged around the QR code 28 allows the QR code carrier 28 to be created. This makes it possible to:

reduce, on the surface portion 20a of a packaged commercial product, a space required to print the QR code carrier 28;

enhance ease of attachment of the QR code carrier 28 to commercial products; and freely design commercial products independently of the configuration of the QR code carriers 28.

Accordingly, during a predetermined campaign period to give customers some kinds of gifts and/or incentives, it is unnecessary to: prepare another design and/or another base material to create commercial products and/or labels.

Second Embodiment

Figure 5A:
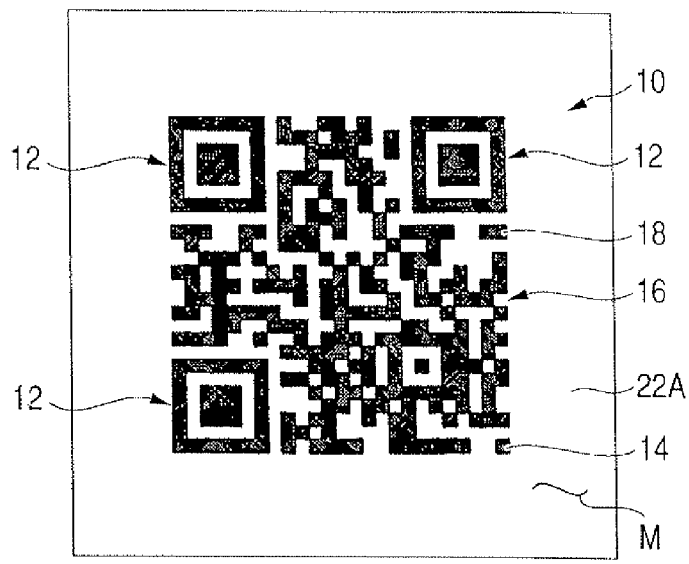
FIG. 5A is a view schematically illustrating a QR code, as an example of two-dimensional code, of a QR code carrier according to a second embodiment of the present invention.

FIG. 5A schematically illustrates a QR code 10 of a QR code carrier 28A according to a second embodiment of the present invention.

Like reference characters are assigned to like parts in the QR code carriers according to the first and second embodiments so that descriptions of the parts of the QR code carrier according to the second embodiment will be omitted.

The QR code carrier 28A also includes a sticker 22A made of transparent resin. The sticker 22A has a substantially square shape larger than the QR code 10. The QR code 10 is printed concentrically on the sticker 22A such that all sides of the QR code 10 are parallel respectively to those of the sticker 22A.

The configuration of the QR code 10 printed on the sticker 22A allows a portion of the sticker 22A around the QR code 10 to serve as a margin M of the QR code 10. The margin M allows the outer periphery of the QR code 10 to be identifiable.

Figure 5B:
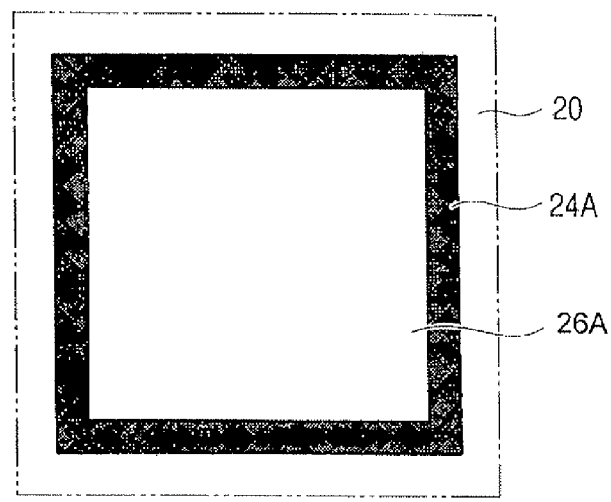
FIG. 5B is a view schematically illustrating a frame of the QR code carrier for causing the QR code to be unreadable according to the second embodiment.

FIG. 5B schematically illustrates a frame 24A of the QR code carrier 28A for causing the QR code 10 to be unreadable according to the second embodiment.

The frame 24A is used to be directly printed on a surface portion 20 of a container-packaged liquid detergent as an example of commercial products according to the second embodiment.

The frame 24A has a square annular shape capable of covering the margin M around the QR code 10.

The frame 24A is formed at its center portion with a non-printed portion 26A whose shape and size are substantially equivalent to those of the QR code 10.

For example, the frame 24A is printed in black (dark) color equivalent to the printed color of the first pattern 12a of each of the positioning marks 12.

Preferably, the black cells of the QR code 10 and the frame 24A are printed in the same color ink or in different inks each of which has the same light reflectance.

Figure 5C:
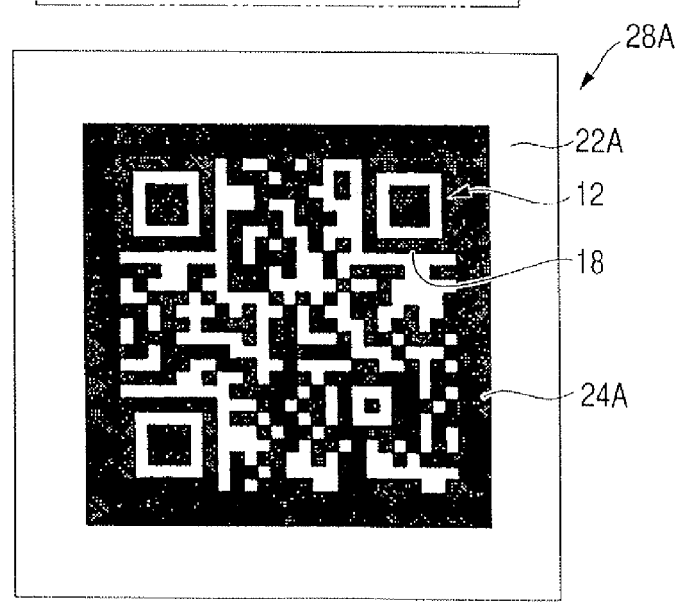
FIG. 5C is a view schematically illustrating the QR code carrier according to the second embodiment.

FIG. 5C schematically illustrates the QR code carrier 28A according to the second embodiment.

The QR code carrier 28A is composed of the sticker 22A on which the QR code 10 is printed beforehand; and the frame 24A onto which the sticker 22A is removably adhered such that the QR code 10 is aligned with the non-printed portion 26A.

Because the color of the frame 24A is the same as that of the first pattern 12a of each of the positioning marks 12, the frame 24A arranged on the margin M around the QR code 10 and contacted thereto allows the first pattern 12a of each of the positioning marks 12 to be unidentifiable while keeping presence of the QR code 10 externally visible (see FIG. 5C). This makes it difficult to identify the outer periphery of the QR code 10.

For the same reason described in the first embodiment, even if someone takes an image of the QR code carrier 28A to illegally read the QR code 10, it is possible to prevent each of the positioning marks 12 from being identified. This is because the frame 24A makes unidentifiable the outer periphery of the QR code 10 before purchasing the corresponding packaged commercial product.

In contrast, a customer purchases the packaged commercial product to which the QR code carrier 28A is printed. Then, the customer removes the sticker 22A from the QR code carrier 28A, so that the QR code 10 with the margin M therearound is mounted on, for example, a white paper whose light reflectance is different from the color of each of the positioning marks 12.

As a result, as illustrated in FIG. 5A, it is possible to identify the first pattern 12a of each of the positioning marks 12, and therefore, to identify the outer periphery of the QR code 10.

As described above, the QR code carrier 28A according to the second embodiment is configured such that:

the frame 24A is to be directly printed on the surface portion 20 of a commercial product; and the QR code 10 is printed on the sticker 22A removably adhered onto the frame 24A such that the frame 24A arranged on the margin M around the QR code 10 allows the first pattern 12a of each of the positioning marks 12 to be unidentifiable (see FIG. 5C).

This makes it impossible to identify the total QR code area.

Specifically, the configuration of the QR code carrier 28A allows customers to visibly identify externally the most part of the QR code 10 while it is kept unreadable. In addition, after buying the commercial product, a customer removes the sticker 22A from the QR code carrier 28A, changing the QR code carrier 28A such that the QR code 10 is readable.

Third Embodiment

Figure 6A:
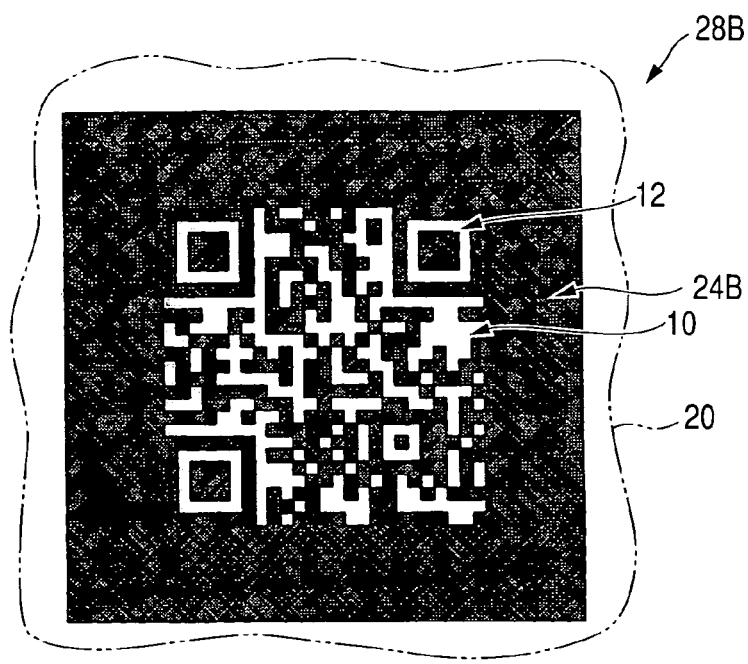
FIG. 6A is a view schematically illustrating a QR code carrier according to a third second embodiment of the present invention.

FIG. 6A schematically illustrates a QR code carrier 28B according to a third embodiment of the present invention. Like reference characters are assigned to like parts in the QR code carriers according to the first and third embodiments so that descriptions of the parts of the QR code carrier according to the third embodiment will be omitted.

In the first embodiment, the QR code 10 and the frame 24 are independently printed on the surface portion 20 of the resin container and on the sticker 22 to be removably adhered onto the QR code 10, respectively.

In contrast, in a QR code carrier 28B according to the third embodiment, the QR code 10 and a frame 24B are integrally printed on the surface portion 20 of the package of a commercial product.

Specifically, the QR code carrier 28B consists essentially of the QR code 10 and the frame 24B that are integrally printed on the surface portion 20 of the package of the commercial product such that the frame 24B is arranged around the QR code 10 to abut thereon. Like the first embodiment, the color of the frame 24B is the same as that of the first pattern 12a of each of the positioning marks 12, making it difficult to identify the outer periphery of the QR code 10, in other words, to identify each of the positioning marks 12.

Figure 6B:
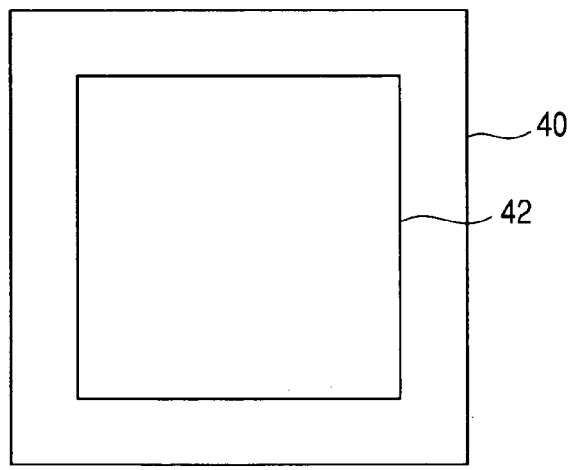
FIG. 6B is a view schematically illustrating a white frame having a substantially square annular shape according to the third embodiment.

FIG. 6B schematically illustrates a white frame 40 having a substantially square annular shape. The white frame 40 is made of a media, such as a paper or resin. The white frame 40 is formed with a slit 42 whose shape and size are equivalent to those of the QR code 10.

Figure 6C:
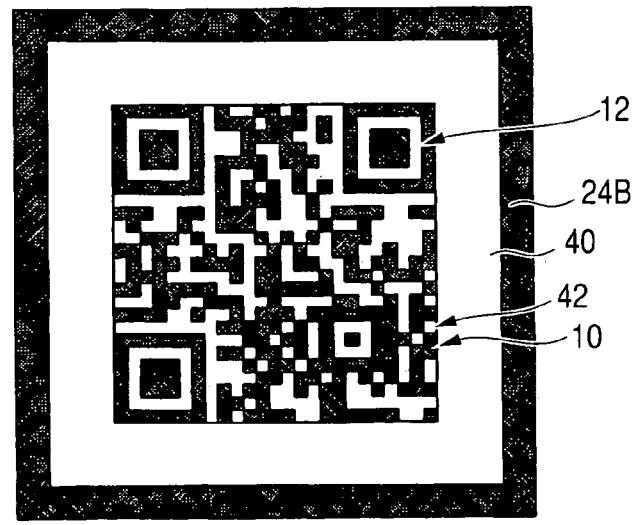
FIG. 6C is a view schematically illustrating a state in which the white frame is mounted on the QR code carrier such that a slit is aligned with the QR code.

FIG. 6C schematically illustrates a state in which the white frame 24 is mounted on the QR code carrier 28B such that the slit 42 is aligned with the QR code 10.

As clearly illustrated in FIG. 6C, because the slit 42 is aligned with the QR code 10, the white frame 40 serves as a margin around the QR code 10 to cover the frame 24B, thereby exposing only the QR code 10 via the slit 42. This makes it possible to identify each of the positioning marks 12, and therefore to identify the outer periphery of the QR code 10.

In the third embodiment, it is preferable that the white frames 40 are given to customers who have purchased commercial products to which the QR code carriers 28B are printed. This is because of preventing someone from illegally reading the QR code 10 of the QR code 28B before he or she purchases it.

As set forth above, in the QR code carrier 28B according to the third embodiment, the QR code 10 and the frame 24B are integrally printed on the surface portion 20 of the package of a commercial product. The frame 24B whose color is the same as that of the first pattern 12a of each of the positioning marks 12 is arranged around the QR code 10, thereby masking the first pattern 12a of each of the positioning marks 12.

Accordingly, the configuration of the QR code carrier 28B allows customers to visibly identify externally the QR code 10 while it is kept unreadable.

In addition, after purchasing the commercial product, a customer mounts the white frame 40, which has been given thereto at the time of purchase, on the QR code carrier 28B such that the slit 42 is aligned with the QR code 10. This allows the slit 42 to expose only the QR code 10 therethrough.

Mount of the white frame 40 on the QR code carrier 28B therefore allows the QR code 10, which has been externally visible but kept unreadable in the QR code carrier 28B, to be changed to be readable.

Fourth Embodiment

Figure 7A:
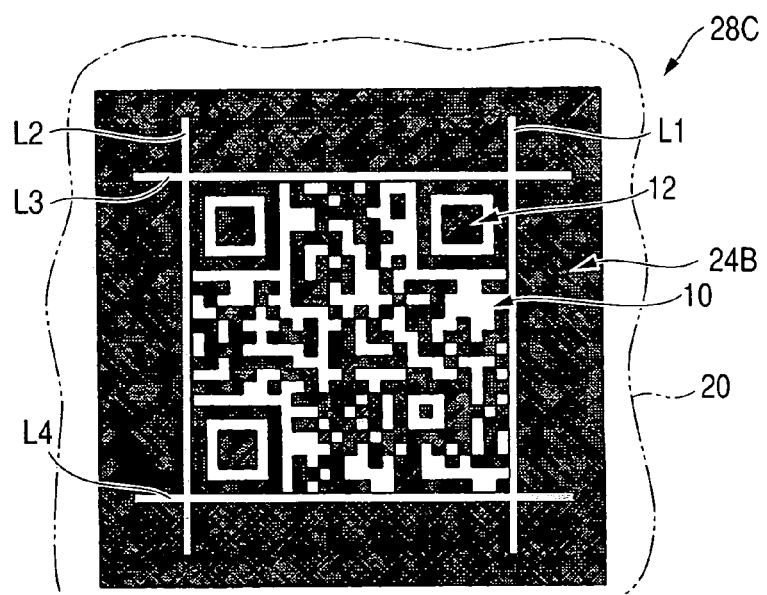
FIG. 7A is a view schematically illustrating a QR code carrier according to a fourth embodiment of the present invention.

FIG. 7A schematically illustrates a QR code carrier 28C according to a fourth embodiment of the present invention. Like reference characters are assigned to like parts in the QR code carriers according to the first and fourth embodiments so that descriptions of the parts of the QR code carrier according to the fourth embodiment will be omitted.

In the fourth embodiment, like the third embodiment, the QR code 10 and the frame 24B are integrally printed on the surface portion 20 of the package of a commercial product. Particularly, in the fourth embodiment, the package of the commercial product is made of a base material that can be easily cut, such as a paper or the like.

Moreover, the QR code carrier 28C according to the fourth embodiment has a structure substantially identical to that of the QR code carrier 28B according to the third embodiment, which is illustrated in FIG. 6A.

In addition to the structure, the QR code carrier 28C according to the fourth embodiment includes cutoff lines L1 to L4 arranged to extend respectively along all sides of the QR code 10. The configuration of the QR code carrier 28C allows a customer, who has purchased the packaged commercial product on which the QR code carrier 28C is printed, to cut on the cutoff lines L1 to L4, thereby separating the frame 24B from the QR code carrier 28C.

Accordingly, the configuration of the QR code carrier 28C allows customers to visibly identify externally the QR code 10 while it is kept unreadable.

In addition, after purchasing the commercial product, a customer can cut on the cut lines L1 to L4 to separate the frame 24B from the QR code carrier 28C, thereby obtaining the QR code 10. This allows the customer to read the QR code 10 with the use of the imaging device 29, which is similar to the first embodiment.

Especially, in the fourth embodiment, it is possible to create the QR code carrier 28C by integrally printing the QR code 10 and the frame 24B on the package of a commercial product; this package is preferably made of single material that can be easily cut. This makes it possible to reduce the cost of creating the QR code carrier 28C. In addition, the cutoff lines L1 to L4 of the QR code carrier 28C allow the originality of the QR code carrier 28C in design to more increase.

Figure 7B:
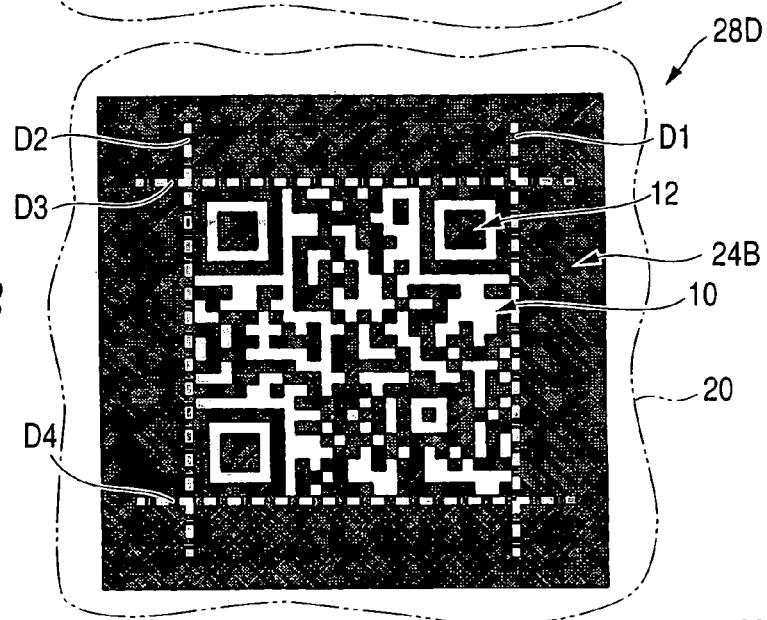
FIG. 7B is a view schematically illustrating a QR code carrier according to a first modification of the fourth embodiment of the present invention.

FIG. 7B schematically illustrates a QR code carrier 28D according to a first modification of the fourth embodiment of the present invention. Like reference characters are assigned to like parts in the QR code carriers according to the fourth embodiment and its first modification so that descriptions of the parts of the QR code carrier according to the first modification of the fourth embodiment will be omitted.

In the QR code carrier 28D, in place of the cutoff lines L1 to L4, perforated dashed lines D1 to D4 are used. The configuration of the QR code carrier 28D allows a customer, who has purchased the packaged commercial product on which the QR code carrier 28D is printed, to easily tear off the frame 24B along the perforated dashed lines D1 to D4 from the QR code carrier 28D.

Thus, in the QR code carrier 28D according to the first modification of the fourth embodiment, it is possible to more easily separate the frame 24B from the QR code carrier 28D to obtain the QR code 10 in addition to obtaining the same effects as the fourth embodiment.

Figure 7C:
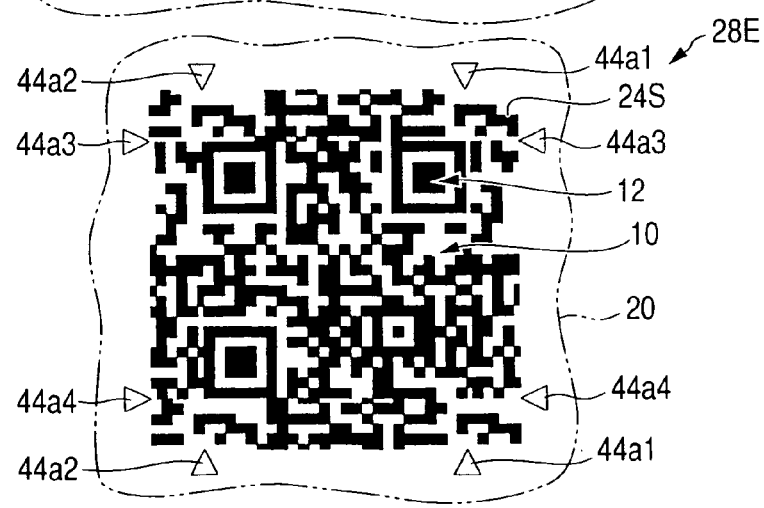
FIG. 7C is a view schematically illustrating a QR code carrier according to a second modification of the fourth embodiment of the present invention.

FIG. 7C schematically illustrates a QR code carrier 28E according to a second modification of the fourth embodiment of the present invention. Like reference characters are assigned to like parts in the QR code carriers according to the fourth embodiment and its second modification so that descriptions of the parts of the QR code carrier according to the second modification of the fourth embodiment will be omitted.

In the QR code carrier 28E, in place of the frame 24B, a frame pattern 24S is used. The frame pattern 24S has a substantially square annular shape, and consists essentially of a plurality of cells 18.

Specifically, the frame pattern 24S is arranged around the QR code 10 such that it continuously extends from part of the cells 18 disposed at the outer periphery of the QR code 10. Each cell 18 is selected from optically identifiable two kinds of cells, which is similar to the first embodiment.

In the second modification, like the fourth embodiment, the QR code 10 and the frame pattern 24S are integrally printed on the surface portion 20 of the package of a commercial product made of a base material that can be easily cut, such as a paper or the like.

Moreover, in the second modification, in place of the cutoff lines L1 to L4, four pairs of indicating marks 44a1-44a1, 44a2-44a2, 44a3-44a3, and 44a4-44a4 are used. Each of the indicating marks 44a1-44a1, 44a2-44a2, 44a3-44a3, and 44a4-44a4 has a shape that allows a direction to be indicated. For example, each of the indicating marks 44a1, 44a1, 44a2, 44a2, 44a3, 44a3, 44a4, and 44a4 has a substantially delta shape.

The indicating marks 44a1 and 44a1 printed on the surface portion 20 of the package of the commercial product are arranged such that their one apexes are opposite to each other to indicate, therebetween, a line corresponding to the cutoff line L1 extending from one side of the QR code 10.

Similarly, the indicating marks 44a2 and 44a2 printed on the surface portion 20 of the packaged commercial product are arranged such that their one apexes are opposite to each other to indicate, therebetween, a line corresponding to the cutoff line L2 extending from another one side of the QR code 10 opposite the one side corresponding to the indicating marks 44a1 and 44a1.

The indicating marks 44a3 and 44a3 printed on the surface portion 20 of the packaged commercial product are arranged such that their one apexes are opposite to each other to indicate, therebetween, a line corresponding to the cutoff line L3 extending from another one side of the QR code 10.

The indicating marks 44a4 and 44a4 printed on the surface portion 20 of the packaged commercial product are arranged such that their one apexes are opposite to each other to indicate, therebetween, a line corresponding to the cutoff line L4 extending from the remaining one side of the QR code 10 opposite another side corresponding to the indicating marks 44a3 and 44a3.

The configuration of the QR code carrier 28E allows a customer, who has purchased the packaged commercial product on which the QR code carrier 28E is printed, to cut on lines indicated by the four pairs of indicating marks 44a1-44a1, 44a2-44a2, 44a3-44a3, and 44a4-44a4. As a result, the frame pattern 24S can be removed from the QR code carrier 28E.

Accordingly, the QR code carrier 28E according to the second modification of the fourth embodiment can obtain the same effects as the fourth embodiment.

Fifth Embodiment

Figure 8:
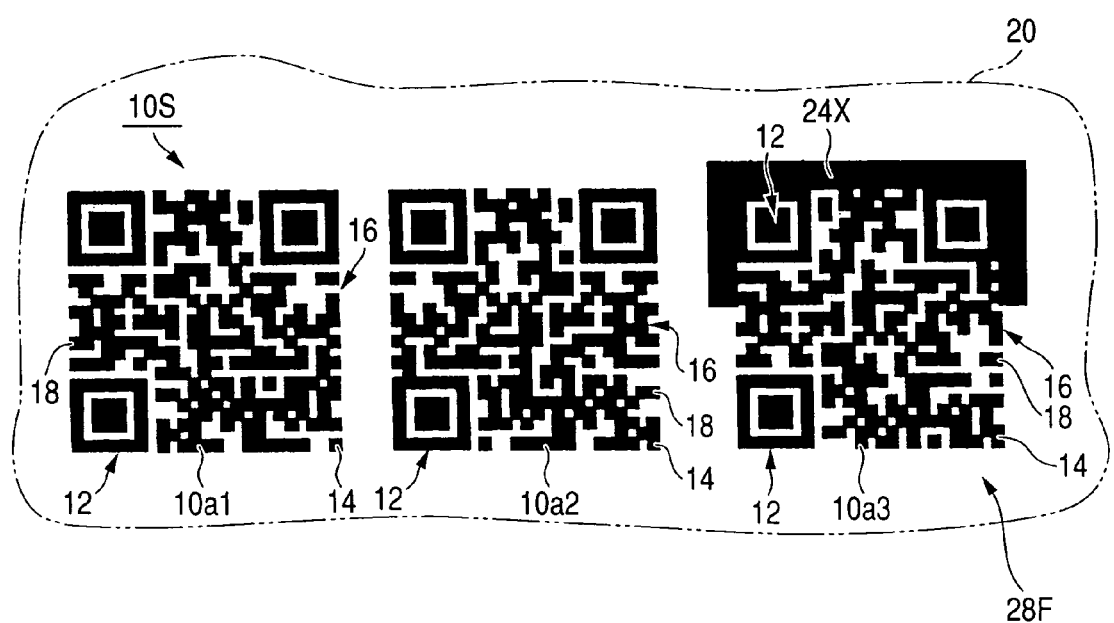
FIG. 8 is a view schematically illustrating a QR code carrier according to a fifth embodiment of the present invention.

FIG. 8 schematically illustrates a QR code carrier 28F according to a fifth embodiment of the present invention. Like reference characters are assigned to like parts in the QR code carriers according to the first and fifth embodiments so that descriptions of the parts of the QR code carrier according to the fifth embodiment will be omitted.

In the fifth embodiment, the QR code carrier 28F is composed of a set 10S of a number of, such as three, QR codes 10a1, 10a2, and 10a3. Each of the QR codes 10a1 to 10a3 has a substantially the same structure as that of the QR code 10.

The QR codes 10a1 to 10a3 are integrally printed directly on the surface portion 20 of the package of a commercial product such that they are aligned with each other at regular intervals.

The QR code carrier 28F is also composed of a frame 24X having a substantially C-shape and serving as a sticker.

Like the first embodiment, the frame 24X is printed in black (dark) color equivalent to the printed color of the first pattern 12a of each of the positioning marks 12.

The frame 24X is so removably adhered onto a margin around one-half part of the QR code 10a3 as to abut on the one-half part of the QR code 10a3.

The set 10S of the QR codes 10a1 to 10a3 is designed such that it is possible to read the set 10S of the QR codes 10a1 to 10a3 only after the total QR code area of each of the QR codes 10a1 to 10a3 has been identified.

Accordingly, because the frame 24A is arranged around the one-half part of the QR code 10a3 to abut thereon, thereby covering the margin therearound, it is impossible to identify the total QR code area of the QR code 10a3, and therefore to identify the set 10S of the QR codes 10a1 to 10a3.

As described above, the configuration of the QR code carrier 28F allows customers to visibly identify externally the set 10S of the QR codes 10a1 to 10a3 while they are kept unreadable.

In addition, after purchasing the commercial product, a customer removes the frame 24X from the QR code carrier 28F, thereby changing the set 10S of the QR codes 10a1 to 10a3 of the QR code carrier 28F to be readable.

The QR code carrier 28F therefore can obtain the same effects as the first embodiment.

In the fifth embodiment, the frame 24X is arranged around the one-half part of the QR code 10a3 to cover the margin therearound, but it can be arranged around the QR code 10a1 to cover the margin therearound.

In the fifth embodiment, the frame 24X is arranged around the one-half part of the QR code 10a3 to cover the margin therearound, but it can be arranged around each of the QR codes 10a1 to 10a3 to cover the margin therearound.

In the fifth embodiment, the frame 24X is designed as in the frame 24 according to the first embodiment, but the frame 24X can be designed as in selectively one of the frames 24A and 24B according to the second to fourth embodiments. In this modification, how to identify the set 10S of the QR codes 10a1 to 10a3 can be described in the corresponding one of the second to fourth embodiments.

Sixth Embodiment

Figure 9:
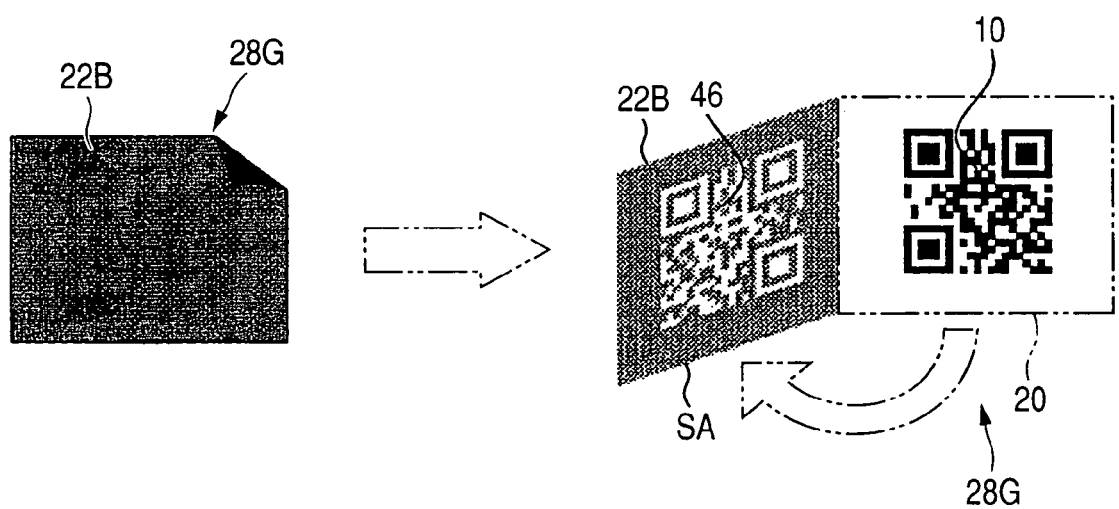
FIG. 9 is a view schematically illustrating a QR code carrier according to a sixth embodiment of the present invention.

FIG. 9 schematically illustrates a QR code carrier 28G according to a sixth embodiment of the present invention.

Like reference characters are assigned to like parts in the QR code carriers according to the first and sixth embodiments so that descriptions of the parts of the QR code carrier according to the sixth embodiment will be omitted.

Referring to FIG. 9, the QR code carrier 28G consists essentially of a sheet-like transparent sticker 22B having a substantially rectangular shape. The transparent sticker 22B has a first surface SA and a second surface opposite each other. For example, the first surface SA can be adhered onto various base materials.

The QR code carrier 28G also consists essentially of a QR code 10 printed on the first surface SA in black or silver color such that the printed QR code 10 can be transferred to various base materials.

The QR code carrier 28G further consists essentially of a mask pattern 46 so printed on the first surface SA in black or silver color as to mask the remaining portion of the first surface SA at which no cells 18 of the QR code 10 are disposed. This allows the mask pattern 46 to abut on the outer periphery of QR code 10, thereby masking the outer periphery of the QR code 10.

The QR code carrier 28G having the configuration set forth above is used to be adhered at its first surface SA onto a surface portion 20 of the package of a commercial product. This adhesion of the first surface SA of the QR code carrier 28G onto the surface portion of the packaged commercial product allows the QR code 10 to be transferred to the surface portion 20 of the packaged commercial product.

Specifically, because the mask pattern 46 is arranged around the outer periphery of the QR code 10 to abut thereon, someone cannot illegally read the QR code 10 before removing the sticker 22B from the surface portion 20 of the packaged commercial product.

On the other hand, after a customer has purchased the packaged commercial product onto which the QR code carrier 28G is adhered, the customer removes the sticker 22B from the surface portion 20. The removal of the sticker 22B from the surface portion 20 allows the mask pattern 46 to be removed from the surface portion 20, thereby exposing only the QR code 10 on the surface portion 20 of the packaged commercial product.

Accordingly, it is possible to change the QR code 10 of the QR code carrier 28G, which has been being unreadable by the mask pattern 46, to be readable.

Especially, once the sticker 22B is removed from the surface portion 20, even if the sticker 22B is adhered onto the QR code 10, it will be difficult to completely align the portion around the QR code 10 at which no cells are disposed with the mask pattern 46 remained on the first surface SA of the sticker 22B.

This characteristic of the QR code carrier 28G allows someone to identify whether the sticker 22B is removed from the surface portion 20 of the packaged commercial product. As a result, the QR code 28G can be preferably used for computer-software (media) packages.

Seventh Embodiment

In the first to sixth embodiments, the present invention is applied to carriers integrated with at least one QR code, but the present invention is not limited to the applications.

Specifically, the present invention can be applied to carriers integrated with at least one of various types of optically readable information symbols, such as barcodes, two-dimensional barcodes except for QR codes, and the like.

The seventh embodiment therefore shows an application of the present invention to a barcode as one example of the various types of optically readable information symbols.

Figure 10A:
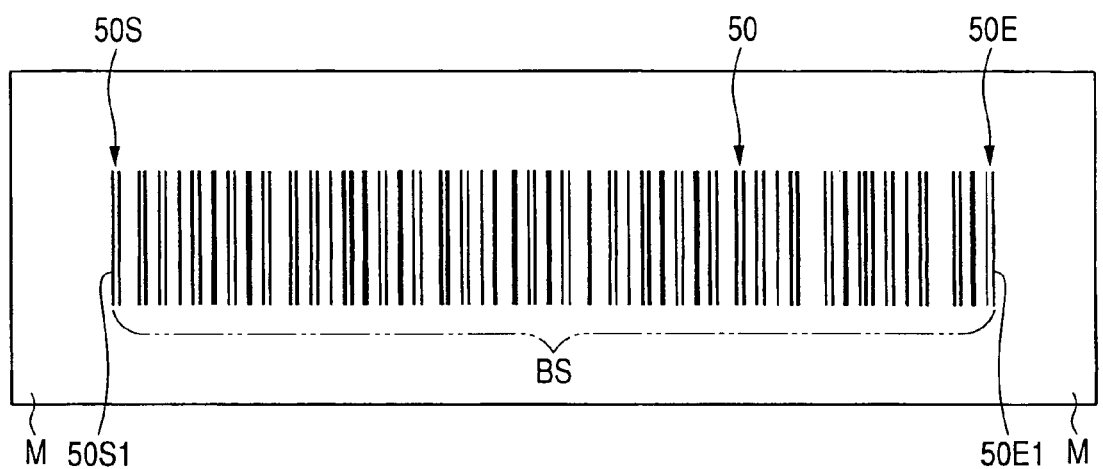
FIG. 10A is a view schematically illustrating a barcode according to a seventh embodiment of the present invention.

FIG. 10A schematically illustrates a barcode 50 according to a seventh embodiment of the present invention.

Referring to FIG. 10A, the barcode 50 consists essentially of a barcode symbol BS of alternating black (dark) bars and white (light) spaces. The barcode symbol BS includes a start symbol character 50S consisting of some bars and spaces and indicating the start of the barcode data. The barcode symbol BS also includes an end symbol character 50E consisting of some bars and spaces and indicating the end of the barcode data.

The barcode 50 also consists essentially of margins M where nothing printed are required; these margins M are disposed at both ends of the barcode symbol BS. Specifically, the start and end bars 50S1 and 50E1 are arranged to be adjacent to the margins M.

Figure 10B:
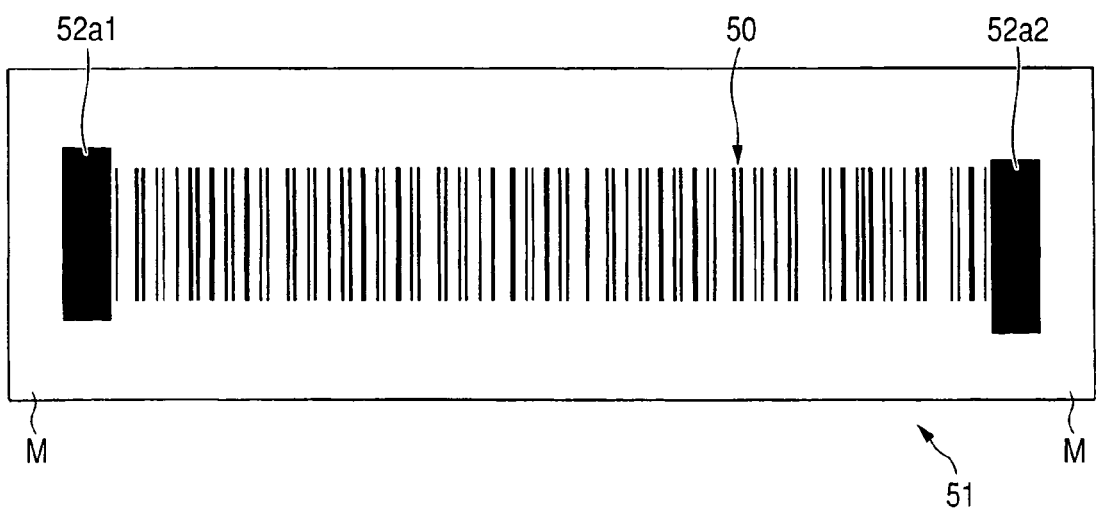
FIG. 10B is a view schematically illustrating a barcode carrier according to a seventh embodiment of the present invention.

FIG. 10B schematically illustrates a barcode carrier 51 according to the seventh embodiment.

The barcode carrier 51 includes the barcode 50 illustrated in FIG. 10A and a pair of stickers 52a1 and 52a2 removably adhered onto at least the start bar 50S1 of the start symbol character 50S and at least the end bar 50E1 of the end symbol character 50E. Each of the stickers 52a1 and 52a2 has a shape and size to cover at least one of the start bar 50S1 and the end bar 50E1.

For example, the pair of stickers 52a1 and 52a2 is printed in black (dark) color equivalent to the printed color of each of the start bar 50S1 and the end bar 50E1.

Specifically, the barcode carrier 51 is configured such that the stickers 52a1 and 52a2 are arranged respectively on the start bar 50S1 and the end bar 50E1 to mask them. This makes it impossible to identify the start bar 50S1 and the end bar 50E1.

Because, in order to read the barcode 50, imaging devices (see FIG. 3 as an example) serving as a barcode reader require to identify both the start bar 50S1 and the end bar 50E1, the configuration of the barcode carrier 51 allows customers to visibly identify externally there is the barcode 50 while it is kept unreadable.

In addition, after buying the packaged commercial product, a customer removes the pair of stickers 52a1 and 52a2 from the barcode carrier 51, changing the barcode carrier 51 such that the barcode 50 is readable.

In the first to seventh embodiments and their modifications, the code carriers 28, 28A to 28G, and 50 are attached onto the package of a commercial product. In the present invention, the package can be regarded as a part of an object such as a commercial/noncommercial product. Specifically, the code carriers 28, 28A to 28G, and 50 can be directly attached onto a surface portion of an object.

In each of the first to fourth embodiments and the sixth embodiment, a corresponding QR code carrier is configured such that a corresponding frame allows all of the positioning marks to be unidentifiable. The present invention is not limited to the configuration.

Specifically, in each of the first to fourth embodiments and the sixth embodiment, as in the case of the fifth embodiment, a corresponding QR code carrier can be configured such that a corresponding frame allows at least part of at least one of the positioning marks to be unidentifiable.

In each of the first to sixth embodiments, a corresponding frame is arranged around a corresponding QR code to abut thereon, but the present invention is not limited to the structure. Specifically, in each of the first to sixth embodiments, a corresponding frame can be arranged to abut on a corresponding QR code such that the frame is overlapped part of the QR code, thereby covering at least one of the positioning marks 12. In other words, in each of the first to sixth embodiments, a corresponding frame not always has to be arranged around the QR code to abut thereon, but it can be arranged on part of, such as at least one of the positioning symbols of, the QR code to abut thereon, thereby covering the part of the QR code.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An optically readable information carrier comprising:
   an information symbol having a predetermined area and including an optically readable mark, the optically readable mark indicating at least part of the predetermined area, the information symbol being optically readable by an information reader after the predetermined area has been identified thereby; and
   a mask member removably adhered on the information symbol and arranged to
      abut on the information symbol, and
      mask at least part of the optically readable mark while keeping presence of the information symbol externally visible to change the predetermined area of the information symbol to be continuously unidentifiable unless any one of the mask member and the information symbol is removed from the other thereof, wherein
   the information symbol has an outer periphery defining the predetermined area and a first color with a first light reflectance,
   the mask member is arranged adjacently around the outer periphery of the information symbol and has a second color with a second light reflectance, the first light reflectance and the second light reflectance substantially being equivalent to each other, and
   the optically readable information carrier is configured such that, when a frame formed with a slit whose shape and size are equivalent to a shape and size of the information symbol is removably mounted on the optically readable information carrier with the slit being aligned with the information symbol, the frame masks the mask member to expose the optically readable mark of the information symbol.

2. An optically readable information carrier according to claim 1, wherein
   the information symbol is a two-dimensional code with the optically readable mark, and
   the mask member is disposed on a margin around the outer periphery of the two-dimensional code.

3. An optically readable information carrier according to claim 1, wherein
   the information symbol is a barcode with a start bar and an end bar each as the optically readable mark, and
   the mask member is arranged on at least one of the start bar and the end bar of the barcode to mask the at least one of the start bar and the end bar.

4. An optically readable information carrier according to claim 1, wherein the mask member comprises:
   a sticker to be removably adhered on a margin of the information symbol; and a print pattern printed in the second color on the sticker to be arranged adjacently around the outer periphery of the information symbol.

5. An optically readable information carrier according to claim 1, wherein
the mask member has a mask pattern with the second color, further comprising:
a sticker on which the information symbol is printed, the mask member and the sticker of the information symbol being removably adhered on each other such that the mask pattern is arranged adjacently around the outer periphery of the information symbol.

6. An optically readable information carrier according to claim 1, wherein
the information symbol and the mask member are integrally printed in the respective first and second colors on an adhered surface of an object.

7. An optically readable information carrier according to claim 1, wherein
the information symbol includes a plurality of two-dimensional codes each having the optically readable mark, and
the mask member is disposed on at least part of a margin around the outer periphery of at least one of the two-dimensional codes.

8. An optically readable information carrier according to claim 1, wherein
the optically readable mark includes at least three optically readable marks, the at least three optically readable marks being arranged at least three portions of the predetermined area, the at least three optically readable marks defining an outer periphery of the information symbol.

9. An optically readable information carrier according to claim 8, wherein
each of the at least three optically marks has an optical pattern that allows a frequency component ratio to be constant independently of any orientations of the information symbol, the frequency component ratio being obtainable by scanning each of the at least three optically marks along a scanning line by the information reader, the scanning line passing through a center of each of the at least three optically marks.

10. An optically readable information carrier comprising:
an information symbol having a predetermined area and including an optically readable mark, the optically readable mark indicating at least part of the predetermined area, the information symbol being optically readable by an information reader after the predetermined area has been identified thereby; and
a mask member removably adhered on the information symbol and arranged to
abut on the information symbol, and
mask at least part of the optically readable mark while keeping presence of the information symbol externally visible to change the predetermined area of the information symbol to be continuously unidentifiable unless any one of the mask member and the information symbol is removed from the other thereof, wherein
the information symbol has an outer periphery defining the predetermined area and a first color with a first light reflectance,
the mask member is arranged adjacently around the outer periphery of the information symbol and has a second color with a second light reflectance, the first light reflectance and the second light reflectance substantially being equivalent to each other,
the information symbol and the mask member are integrally printed in the respective first and second colors on an adhered surface of an object, and
the optically readable information carrier further comprises a cutoff indicating mark arranged around the mask member and configured to indicate boundary lines between the outer periphery of the information symbol and the mask member.

11. An optically readable information carrier according to claim 10, wherein
the cutoff indicating mark is integrally printed on the adhered surface of the object together with the information symbol and the mask member.

12. An optically readable information carrier comprising:
an information symbol having a predetermined area and including an optically readable mark, the optically readable mark indicating at least part of the predetermined area, the information symbol being optically readable by an information reader after the predetermined area has been identified thereby; and
a mask member removably adhered on the information symbol and arranged to
abut on the information symbol, and
mask at least part of the optically readable mark while keeping presence of the information symbol externally visible to change the predetermined area of the information symbol to be continuously unidentifiable unless any one of the mask member and the information symbol is removed from the other thereof, wherein
the information symbol has an outer periphery defining the predetermined area and a first color with a first light reflectance,
the mask member is arranged adjacently around the outer periphery of the information symbol and has a second color with a second light reflectance, the first light reflectance and the second light reflectance substantially being equivalent to each other,
the information symbol is composed of a plurality of cells, each of the cells being in any one of the first color and second color, and
the optically readable information carrier further comprises a sticker with an adhesion surface to be removably adhered at the adhesion surface on an adhered surface of an object, the information symbol being printed on the adhesion surface of the sticker, the mask member is a mask pattern with the second color, the mask pattern being printed on a predetermined portion of the adhesion surface of the sticker, no cells of the information symbol being printed on the predetermined portion of the adhesion surface wherein upon removal of the sticker from the adhered surface of the object, the information symbol is configured to be transferred to the adhered surface of the object, and the mask pattern is configured to remain in the sticker.

* * * * *